Figure 1:
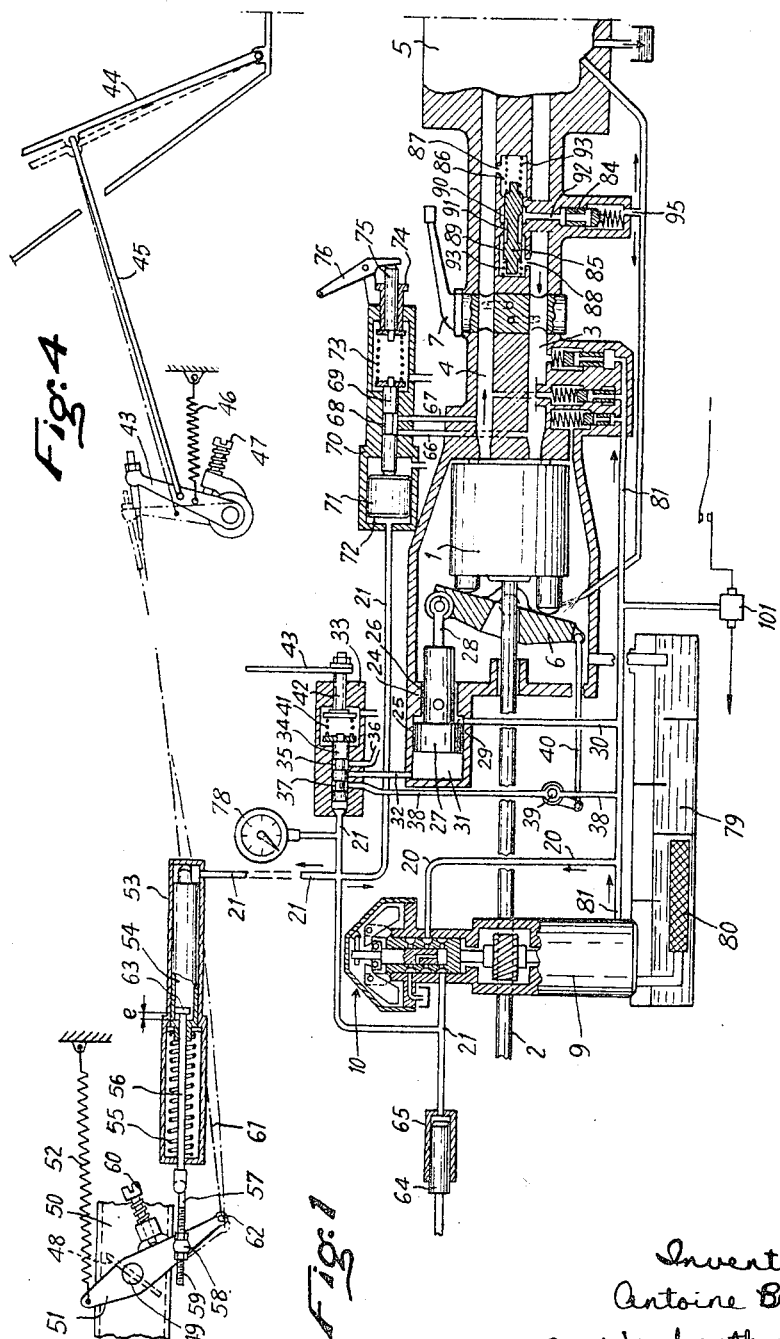
Figure 2:
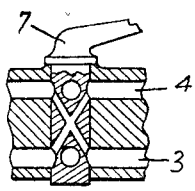

Nov. 8, 1966   A. BRUEDER   3,283,606
AUTOMATIC REGULATORS FOR HYDROSTATIC TRANSMISSIONS
OF AUTOMOBILE VEHICLES
Filed March 25, 1963   2 Sheets-Sheet 1

Inventor
Antoine Brueder
By Wenderoth, Lind,
and Ponack,
Attorneys

Nov. 8, 1966   A. BRUEDER   3,283,606
AUTOMATIC REGULATORS FOR HYDROSTATIC TRANSMISSIONS
OF AUTOMOBILE VEHICLES
Filed March 25, 1963   2 Sheets-Sheet 2

Inventor
Antoine Brueder
By Wenderoth, Lind,
and Ponack,
Attorneys

United States Patent Office 3,283,606
Patented Nov. 8, 1966

3,283,606
AUTOMATIC REGULATORS FOR HYDROSTATIC TRANSMISSIONS OF AUTOMOBILE VEHICLES
Antoine Brueder, Paris, France, assignor to Societe Anonyme Andre Citroen, Paris, France, a French corporation
Filed Mar. 25, 1963, Ser. No. 267,553
Claims priority, application France, June 29, 1962, 902,524, Patent 1,336,732
11 Claims. (Cl. 74—472)

It is already known to drive the road wheels of an automobile vehicle through a hydrostatic transmission to which the power pressure is delivered from a thermal engine. As a rule, this transmission comprises essentially a pump driven from the vehicle engine and one or more hydraulic motors receiving the pump output and transmitting the drive motion to the road wheels.

The variation in the necessary reduction ratio is obtained by varying either the volumetric capacity of the pump alone, or the cubic capacity of the hydraulic motors, or a combination of both means.

Certain transmission systems are so designed that a more or less important fraction of the power output will not pass directly through the hydraulic transmission.

Whatever the disposal or the pump-and-motors combination contemplated, many difficult problems arise from the regulation and control means necessary for obtaining the most suitable reduction ratio under any circumstances.

It is the primary object of the invention to provide a regulating device whereby the above-listed drawbacks are eliminated.

In order to afford a clearer understanding of the arrangement according to this invention, a simplified transmission will be assumed to comprise a pump driven from the vehicle engine and delivering its output into a receiver (for instance a hydraulic motor through which the power is transmitted to the wheels). The arrangement may comprise one receiver for each road or drive wheel. Only the pump is assumed to be of the variable volumetric capacity type, but if desired the same regulating system may be caused to control the variation in the cubic capacity of the receiver or receivers in due time. This solution is obviously within the capacity of anybody conversant with the art.

It will also be assumed that the vehicle is equipped with a three position rotary valve for reversing the direction of motion of the vehicle. Thus, this device will provide a first "neutral" position in which the pump inlet and outlet are short-circuited, a second position corresponding to the forward drive in which the hydraulic fluid flows directly through the device, and a third position, "reverse," in which the direction of flow of the hydraulic fluid is reversed.

As in all hydrostatic transmissions a feed pump is provided for making up circuit losses and feed the servo cylinders through distributors designed to this end.

According to the present invention, a pressure proportional to the engine speed is used for performing the four main regulating functions, that is:

(a) Controlling the position of the slide valve controlling in turn the inclination of the pump disc against the resistance of the spring of which the tension is adjusted by the driver through the accelerator pedal as a function of the desired vehicle speed.

(b) Controlling through a hydraulic device the position of the carburettor throttle, said device being designed with a view to set the throttle in a predetermined and precise position as a function of the engine characteristics for each velocity of rotation of the engine.

(c) Controlling another hydraulic cylinder for adjusting the ignition timing of the engine to the optimum value consistent with the engine speed and the momentary opening of the carburettor throttle governing the filling of the engine cylinders with the air-fuel mixture.

(d) Controlling the movements of the slide valve of an automatic clutch, the cross-sectional area of this valve—which causes the two ducts of the high-pressure pump to communicate with each other when the engine is idling—becoming zero when the engine speed is about 1,200 r.p.m.'s.

A fifth, ancillary function may consist in indicating the engine speed on a pressure-gauge having its dial graduation divided into revolutions per minute.

In the proposed arrangement the pump disc is controlled by a double-acting differential-piston hydraulic device, the smaller piston face constantly receiving the whole low-pressure thrust, and the larger piston face receiving the pressure adjusted through the servo-action slide valve responsive to the accelerator pedal actuated by the driver.

The pump disc inclination control slide valve (providing the ratio-reducing servo-action) is of the conventional three-way type: according to its direction of motion it connects the pressure fluid supply to the larger piston face or on the contrary to the exhaust, whereby the pump disc inclination is respectively increased or decreased.

In the device proposed in this invention the tension of the slide-valve spring is adjusted by means of the so-called accelerator pedal. Except for a very short fraction of the initial stroke of this pedal with a view to increase slightly the idling speed (800 to 900 r.p.m.'s), in contradistinction with known arrangements this pedal does not exert any direct action on the carburettor throttle, the latter moving automatically to the ideal position which it should have at any time as a function of the engine speed. This position is predetermined by construction, with due consideration for the engine characteristics so that at any time the power output delivered by the engine remains within the limits of minimum fuel consumption.

Conventional ignition timing devices comprise as a rule centrifugal devices adapted to modify the ignition timing as a function of the engine rotational speed. As a substitute therefor, this invention provides a cylinder and spring device responsive to the pressure delivered by the centrifugal device incorporated in the general system, in combination with any suitable and known mechanical means for establishing the precise relationship between the movement of the piston of said hydraulic device and the angular variation in the ignition timing which is to be obtained.

For various reasons well known to specialists a pump should never be operated under zero output conditions and with the disc perpendicular to the pump axis. When it is desired to stop the vehicle while running the engine at idling speed, it is necessary to short-circuit the inlet and outlet ports of the pumps to prevent the hydraulic pressure from rising in the hydraulic motors.

To this end, it is known to use a short-circuit valve adapted to be closed gradually either manually as in the case of a conventional clutch of automobile vehicle, or through servo means whereby the valve position is controlled by the engine speed, as in known arrangements of modern passenger vehicles. The solution brought by the present invention to this problem, due to its incorporation to a general regulating system, is simplified by the fact that the valve is operated by a pressure subordinate to the velocity of rotation delivered from a central centrifugal governor controlling several functions. On the other hand, this arrangement constitutes a substantial simplification over known automatic devices due to the elimination of any condition of equilibrium between the centrifugal force—depending on speed—and the pressure obtained in the transmission circuit. In the proposed solution only the cross-sectional passage area in the valve is subordinate to speed, without any subservience to the developed pressure.

It is another advantage of this device to control only one parameter—the velocity of rotation—instead of two: the velocity of rotation plus the carburetor throttle; in addition, the regulation takes place with more precision and without any pumping action.

Starting the engine by energizing an electric starter motor will rotatably drive the pump and thus generate a sufficient hydraulic pressure. In case of faulty operation a low-pressure drop might destroy the component elements if the engine is not stopped in due time. The pressure-responsive switch will act as a safety device in this respect.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 1 is a general diagrammatic view of the regulating means of this invention, and FIGURES 2, 3, 4, 5 and 6 are fragmentary and sectional views of component elements of the regulating installation.

A thermal engine, not shown, drives the pump 1 through a transmission shaft 2. This pump 1 is connected through parallel pipe lines 3, 4 to one or a plurality of hydraulic motors 5 driving through various known means the road wheels of the vehicle.

The reduction ratio between the input and output sides of a transmission depends on the ratio of the cubic capacity of the pump to that of the engine. Therefore, to permit the variation of this ratio, there is shown diagrammatically in FIG. 1, by way of example, a variable-capacity pump wherein the capacity is changed by varying the inclination of its disc 6. It would also be possible to provide a transmission comprising variable-capacity motors without altering whatsoever the automatic regulation device proposed herein. The forward and reverse drive are obtained in the known fashion by reversing the direction of flow with the assistance of a three-position rotary valve 7. In a first position this valve 7 permits the forward drive, as shown in FIG. 1; in another position (FIG. 2), the reverse is obtained by crossing the valve ducts interconnecting the lines 3, 4, and finally, in a third position (not shown) intermediate said first and second position, all the inner ducts of the valve are connected to both lines 3 and 4, so that the latter are "short-circuited."

The output shaft 2 of the engine drives through any suitable gearing 8 a feed pump 9 and the centrifugal governor 10 adapted to deliver a fluid under pressure, the latter being proportional to the velocity of rotation of the engine. This device (see FIG. 5) consists of a body 11 in which a socket 12 is rotatably mounted and driven from the gearing 8. Pivotally mounted on the upper end of this socket 12 are a pair of inertia weights 13 adapted under the influence of the centrifugal force to engage a small ball thrust bearing 14 transmitting the resulting axial thrust to a slide valve member 15 fitted in an axial bore formed in the aforesaid socket 12. A radial arm or pin 16 prevents the slide valve 15 from revolving in the socket 12. This socket is also formed with three outer grooves each formed in turn with a series of radial holes in their bottom, that is, a groove 17 receiving the fluid under pressure delivered by the pump 9 through the body 11 and radial duct 20, a groove 18 adapted to transmit through the body 11 and duct 21 the pressure adjusted by the centrifugal device, and finally a groove 19 communicating through an outlet port with the return line leading to the fluid reservoir. To this end, the slide valve 15 comprises a groove 22 connected, according to the centrifugal force, either to the hydraulic fluid inlet 17 or to the return line 19. This groove 22 communicates through a duct 23 with the bottom of the slide valve which is further connected through a port 18 with the line 21. A device of this type is now conventional and it is known that the pressure available at 21 is proportional to the square of the velocity. Other devices are known which are capable of delivering a pressure proportional to a velocity of rotation. This device is described by way of example only in order to afford a clearer understanding of the general operation of the transmission regulation system.

The inclination of disc 6 is governed by a differential cylinder body 24 comprising a large bore 25 and a small bore 26 slidably engaged by a differential piston 27 connected through a rod 28 to the disc 6 of pump 1. This piston 27 forms in bore 25 two chambers 29, 31; chamber 29 constantly connected with the low-pressure system through a pipe line 30, while chamber 31 receive through a line 32 a pressure adjusted by the disc inclination servo-action device, or velocity servo-action device, comprising a body 33 in which a slide valve member 34 is slidably fitted; this slide valve 34 comprises two grooves, communicating the one 35 through the line 36 with the return line to the reservoir and the other 37 through the low-pressure pump 9 through a line 38 in which the fluid-flow retarding device 39 is inserted. This retarding device 39 may consist simply of a jet or any other known means adapted to produce a fixed or manually adjustable loss of pressure, experience teaching however that it is preferable to provide means whereby the resistance to the fluid flow may be adjusted as a function of the pump disc inclination. Therefore, the resistance is shown diagrammatically as being variable through a linkage 40 responsive to the position of disc 6. This variable resistance may be of any known and suitable type.

One end of slide valve 34 is subjected through the line 21 to a hydraulic force proportional to the engine velocity of rotation. On the other side the force of a spring 41 is applied to this slide valve, the spring tension being adjustable by rotating more or less the screw 42 and arm 43. This rotation is controlled by the driver by means of the accelerator pedal 44 through a link rod 45. A tension spring 46 urges the assembly to its inoperative or release position adjustable by means of a stop 47.

When the hydraulic thrust is balanced by the force of spring 41, the slide valve 34 is in a neutral position isolating the chamber 31. If the force produced by the pressure in line 21 is lower than the force of spring 41, that is, if the velocity of rotation is lower than that demanded by the driver, the slide valve 34 will cause the chamber 31 to communicate through the line 32 with the groove 35 and the return line 36 to the reservoir. Consequently, piston 27 is moved to the left and the disc 6 is moved toward its straight position, so that the reduction ratio of the transmission will increase and the torque demanded to the thermal engine (or the load applied thereto) decreases, the engine resuming the requisite velocity of rotation. In the opposite case, 31 communicates with the low pressure source through 32, 37, 38 and 39, the operative area on which the pressure is exerted in chamber 31 on piston 27 being greater than the operative area subjected to the pressure in chamber 29, whereby the movement from left to right is still possible.

Figure 3:
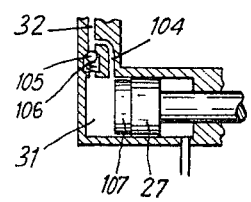
Figure 5:
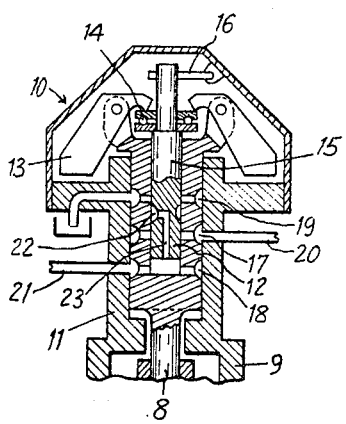
Figure 6:
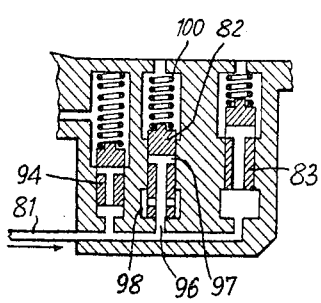

Preferably, the disc movement toward higher reduction ratios (smaller cubic capacity of the pump) should be retarded gradually between about one third of the cubic capacity and the minimum cubic capacity of the pump, To achieve this result, a device applying a variable resistance to the fluid flow may be inserted in the line 32, this variable resistance device being adjusted automatically as a function of the disc inclination as in the case of the device 39 described hereinabove. It is also possible to utilize the displacement of piston 27 for producing a variable throttling effect in the return line from the chamber to the line 32 and from this line through lines 35 and 36 to the reservoir. A solution of this character is shown in FIG. 3.

The hydraulic fluid circulates freely in the direction from 32 to 31. In the opposite direction the ball valve 105 urged by the spring 106 causes the fluid to flow through the side duct 104. From a predetermined angular position of disc 6, the end 107 of piston 27 registers with the port of duct 104. The diameter of the piston section 107 is somewhat smaller than that of the bore of chamber 31, so that when the piston 27 moves from right to left the liquid can escape to 104 through the clearance, but the resistance to the fluid flow increases as the piston moves leftwards. When the piston is displaced towards the left, the portion whose diameter is slightly reduced arrives at a certain moment in engagement before the orifice 104. At this moment, the liquid can no longer flow without meeting a retarding throttling, and the length of the portion engaged increasing during the end of the displacement, this throttling assumes an increasing importance which causes an elevation of the pressure more and more strongly in the chamber 31.

The transmission described herein and notably the automatic regulation system is applicable to any vehicle equipped with a combustion engine, irrespective of its type and its fuel feed system or fuel injection system. To facilitate the understanding of the present invention the example of a conventional carburettor-fed engine has been described wherein the variation in the engine filling is caused by the operation of a so-called carburettor "butterfly" or throttle 48 pivoted on a pin 49 so as to close more or less the induction pipe or choke 50. Solid with this pin 49 is a lever 51 urged in the throttle opening position by a tension spring 52. A fixed cylinder body 53 has slidably mounted therein a piston 54 urged by a spring 55 and connected through an adjustable rod 57 to said lever 51, this spring 55 acting in the direction to close said throttle 48. A pair of nuts is provided on the screw-threaded portion 59 of rod 57 for adjusting the position of this rod relative to the lever 51.

The pressure proportional to the engine speed is applied through the line 21 to the end cylinder 53 opposite to the piston rod 56 to exert a compression force on spring 55. The diameter of piston 54, the characteristics of springs 55 and 52, and the leverage provided therebetween, are so calculated that when the engine is idling the forces are balanced, whereby the piston 54 engages the bottom of cylinder 53 and the lever 51 engages the conventional slow-running adjustment screw 60. However, for reasons to be set forth presently, when this adjustment has been completed the length of rod 57 will be increased to such an extent that under the influence of springs 52 the throttle 48 will open to an extent sufficient to allow the engine to revolve at 800 or 900 r.p.m.'s. A cable 61 attached to the end 62 of lever 51 is adapted to be pulled when the accelerator pedal is fully released so as to restore the lever 51 in its slow-running position, that is, in engagement with the stop screw 60.

A clearance "e" occurs between the head 63 of rod 56 and the piston section retaining this head in the throttle opening position, but not in the throttle closing direction unless the cable 61 is operative or pulled.

The purpose of the regulation device illustrated herein is to demand from the engine the power output necessary at any time only at the speed corresponding to the most economical engine operation. Thus, to each velocity of rotation there corresponds a power output lying exactly on the curve of the minimum specific fuel consumption. This power output is always lower—except below a certain velocity of rotation—to the maximum power output at the speed contemplated. Therefore, it can be obtained by a precise throttle opening inferior to the fully-open position. Under these conditions, it is clear that the law of throttle opening as a function of the velocity of rotation of the engine is calculated on a test bench. The desired law of throttle opening is obtained by simply calculating all the characteristics of the transmission of motion between the displacement of piston 54 and the throttle 48.

Experience teaches that this can be obtained with a rather high degree of precision by using simple lever systems or linkage means, provided that their kinematic arrangement be properly selected. The use of a set of suitably shaped cams may in certain cases prove more accurate.

Conventional ignition distributor and contact-breaker units are equipped as a rule with self-operating centrifugal devices for automatically adjusting the ignition timing as a function of engine speed. The mechanical device may also be replaced by means responsive to the pressure of the hydraulic speed indicator by simply adapting to the ignition distributor a piston 64 slidably fitted in a cylinder 65 receiving the hydraulic pressure through the line 21 and operatively connected to the distributor timing control lever, for example through any suitable mechanical means or cam systems as necessary for obtaining the desired result.

Regarding the operation of the automatic regulator when the vehicle is still, the valve 7 being in the forward drive or reverse position, it is necessary to short-circuit the lines 3 and 4 of the pump. To this end, two pipe lines 66 and 67 interconnect these lines 3, 4 through the groove 68 formed in the slide valve 69 movable in the body 70. The slide valve 69 is urged in the closing direction by a piston 71 of relatively large cross-sectional area receiving the fluid pressure as a funtion of speed in a chamber 72 through the line 21.

The slide valve 69 is urged in the opening direction by a spring 73 having its tension fixedly adjustable by means of a screw 74 but adapted under certain conditions to be compressed to a complementary extent by the pushrod 75 controlled through any suitable and known means, herein the form of a lever 76.

The adjustment of the tension of spring 73 by means of the screw 74 is such that the piston 71 responsive to the pressure delivered through the line 21—with the engine idling—the loss of pressure in the circuit 66–67 which results from the throttling of the slide valve will not exceed the pressure necessary for driving the vehicle on a level. As the slide valve position necessary to obtain this condition can be known, and knowing on the other hand the position in which this slide valve must lie for closing completely the circulation between 66 and 67, the stiffness of spring 73 must be so calculated that the total displacement between these two positions results from a pressure variation in chamber 72 which is equal to that provided by the speed indicator between the slow-burning speed and a speed of about 1,200 r.p.m.'s.

The additional compression of spring 73 with the assistance of push-rod 75 urged by the lever 76 will shift the closing speed and reduce the loss of pressure at speeds inferior to said closing speed. This device is useful during the period in which the engine is started and responsive to the cold starter device. In this case the engine will revolve at a faster speed but the road wheels should not be driven. The lever 76 may advantageously be actuated by means of the manual or automatic device provided for operating the starter or choke.

The pressure gauge 78 connected on line 21 may carry a dial graduated in revolutions per minute, once the relationship between the pressure delivered by the centrifugal system and the actual velocity of rotation is known.

The pump 9 drawing hydraulic fluid from a reservoir 79 through a filter 80 delivers the fluid through the line 81 feeding the various pipe lines 20, 30 and 39 already described hereinabove. This line 81 injects the whole output of the pump (as the quantity necessary for operating the regulator is negligible) into the transmission circuit. This injection can only be directed, of course, into that one of lines 3 or 4 of the hydraulic circuit which is not subjected to the high pressure. If normally line 3 is fed with low-pressure fluid and line 4 with high-pressure fluid, a reversal may occur when the vehicle passes from normal driving condition to coasting (i.e., with the road wheel driving the engine). Two slide valves are provided for directing the fluid toward the proper line. Thus, slide valve 82 closes if the hydraulic pressure in line 4 exceeds the low pressure value, and slide valve 83 is moved by the fluid flow, the pressure on the output side of pump 9 being greater than that prevailing in line 3.

In fact, the pressure in line 3 cannot exceed that adjusted by means of the calibration valve 84. This valve is put into communication with the low-pressure circuit line 3 through a selection valve 85 urged leftwards by the pressure prevailing in chamber 86 and delivered from line 4 through the orifice 87.

Should the pressures be reversed in lines 3 and 4, the slide valve 85 would move to the right under the influence of the pressure from line 3 through the orifice 88.

In the two end positions of the selection valve 85 the hydraulic fluid flows between chambers 86 or 89 and the central chamber 90 through longitudinal splines or grooves 91 formed in the slide valve member 85. Chamber 90 communicates with the calibration valve 84 through a line 92. In case of pressure equality the slide valve 85 will take a neutral position under the influence of a pair of antagonistic springs 93. In this position—which is quite exceptional—the output of the low-pressure pump 9 cannot be discharged through the valve 84; therefore, a safety valve 94 is provided in line 81. The calibration pressure of this valve 94 must obviously be greater than that of valve 84. That portion of the output of pump 9 which passes through the valve 84 is returned through the lines 95 to all of the operating portions of the system where the sprinkling of cooling or lubricating fluid is deemed necessary. A circulation through a radiator may also be contemplated.

Each valve consists preferably of a cylindrical member such as 82, formed with an axial bore 96 opening on one side only and with a transverse hole 97. The slide valve moves in a bore between two chambers 98, 99. In chamber 99 a spring 100 urges the slide valve member to its closing position so that the transverse hole 97 is obturated by the bore in the valve body. The stroke may be as long as required for ensuring the necessary fluid-tightness.

This type of valve may also be used in the construction of the selection valve 82, 83 with a relatively weak spring 100, or in the construction of calibration or safety valves such as 84 and 94, suitable springs being provided therein.

Branched off the circuit 81 is a two-pole pressure-responsive switch 101 which closes the engine ignition circuit only when a minimum low-pressure value is attained, upon actuation of the electric starter motor. Since the technique of pressure-responsive contacts and switches is widely known, it is not deemed necessary to describe this device.

The accelerator pedal 44 (FIGS. 1 and 4) is adapted, with the assistance of rod 45, to actuate the lever 43, adjusting the tension of spring 41 of the slide valve controlling the inclination of disc 6 in order to regulate the requisite velocity of rotation and therefore the power requirement.

At the end of lever 43 a cable 61 or any other suitable telescopic connection providing a unidirectional action is attached. The length of this cable or telescopic device should be adjustable for instance by means of a nut 102 and the screw-threaded rod 103.

In the inoperative position of pedal 44 the lever 43 is urged by spring 46 for engagement with stop 47. The adjustment of cable 61 must be such that the lever 51 mounted on the induction pipe or choke just abuts against the stop screw 60. To this end the spring 46 must be preponderant with respect to the spring 52 tending to keep the throttle 48 open.

During the initial portion of the depression of pedal 44 the cable 61 is rapidly slackened, whereby spring 52 will open the throttle 48 until the head 63 of the retaining rod 56–57 engages the inner shoulder of piston 54. This first throttle position delivers a small trickle of air/fuel mixture just sufficient to run the engine at a velocity of 800 to 900 r.p.m.'s under no-load conditions. From this time on, the angular movement of this lever 43 controlled by the pedal 44 will regulate the velocity of rotation, but the pedal 44 becomes inoperative with respect to the throttle 48 in the acceleration direction. The throttle opening is controlled only by the servo-action piston 54 as a function of the actual speed obtained at any time by the engine.

In case the pedal 44 were gradually released the reduction in the engine power output takes place through the reduction of the engine speed, as long as the minimum transmission reduction ratio is not attained by the maximum inclination of disc 6. From this time on, it is sufficient to reduce imperatively the opening of throttle 48. This reduction takes place at the end of the return stroke of lever 43 by pulling the cable 61, the piston 54 permitting the return movement of rod 56.

From the foregoing it will be readily understood by anybody conversant with the art that since the action exerted by the accelerator pedal on the speed adjusting device (that is, the inclination of disc 6) is not attended as in known propositions with a control action exerted directly on the carburettor throttle, the regulation takes place more adequately.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. Automatic regulation device for hydrostatic transmission of an automobile vehicle having a thermal engine, a fuel feed circuit therefor and an acceleration pedal, said transmission comprising a hydraulic pump having inlet and outlet ports and driven from said thermal engine, at least one hydraulic motor actuated by said pump, a disc adapted to be set in different angular positions for controlling the variation in the output of said pump, a hydraulic circuit connecting said pump and motor, a valve for short-circuiting said inlet and outlet ports of said hydraulic pump, a feed pump driven by said thermal engine connected to said hydraulic circuit, a centrifugal device associated with said feed pump for controlling the delivery of fluid from said feed pump to said hydraulic circuit at a pressure of a value proportional to the velocity of rotation of said thermal engine, means controlled by said feed pump for controlling the delivery of fuel to said thermal engine feed circuit, said means being responsive in a unidirectional manner to said accelerator pedal, hydraulic cylinder means adapted to modify the inclination of said pump disc and a second valve controlled by said feed pump controlling said hydraulic cylinder means.

2. A device as set forth in claim 1 wherein control members for adjusting the timing of the thermal engine ignition system are provided controlled by said feed pump.

3. A device according to claim 1 wherein a lever is fixed to the carburetor throttle of said engine, a cable connects said accelerator pedal to said lever, a spring urges said throttle to opening position and a spring coacting with said pedal urges said throttle by said cable to closing position.

4. A device according to claim 1 wherein control members are provided responsive to the action of said feed pump wherein the pressure is subordinate to the engine speed, said control members comprising a cylinder, a piston movable in said cylinder, a spring resisting the movement of said piston, a rod connected at one end to the carburetor throttle of the engine and having the other end extending into said piston so that said throttle opens under the influence of a return movement when the pressure controlled by said feed pump moves said piston.

5. A device according to claim 1 wherein said valve for short-circuiting said hydraulic pump comprises a cylinder communicating with said circuit, a piston movable in said cylinder, a slide valve comprising a central groove, an adjustable spring coacting with one end of said slide valve, said groove being adapted to short-circuit said hydraulic circuit between said hydraulic pump and hydraulic motor and one face of said piston bearing against the other end of said slide valve.

6. A device according to claim 1 wherein said second valve is subjected to the action of a counter-bearing spring whose pressure is adjustable by means of a lever, said lever being rigidly connected to said accelerator pedal, so that when said pedal is depressed said second valve reduces the pump disc inclination.

7. A device according to claim 1, wherein said feed pump is connected to both lines of said hydraulic circuit from said hydraulic pump by valve means and a slide valve is provided having its ends responsive to the pressures prevailing in said lines for automatically connecting the line in which low-pressure is exerted with a discharge circuit at a lower pressure.

8. A device according to claim 1, wherein said hydraulic cylinder means for actuating said disc is of the double-acting differential-piston type.

9. A device according to claim 1, wherein a variable hydraulic resistance is provided in the feed pump circuit supplying said hydraulic cylinder means.

10. A device according to claim 9 wherein said variable hydraulic resistance is controlled from said disc to retard the displacement of said disc in the direction to increase the volumetric capacity of the pump during the last third of the stroke causing the inclination of said pump.

11. A device according to claim 1, wherein a pressure-responsive switch is provided for closing the thermal engine ignition circuit after a minimum pressure has been attained.

References Cited by the Examiner
UNITED STATES PATENTS

| | | |
|---|---|---|
| 2,719,437 | 10/1955 | Nallinger. |
| 2,874,591 | 2/1959 | Thoma _____ 74—687 X |
| 3,058,297 | 10/1962 | Tolley. |
| 3,081,647 | 3/1963 | Blenkle _____ 74—687 X |

DAVID J. WILLIAMOWSKY, *Primary Examiner.*

DON A. WAITE, *Examiner.*

H. S. LAYTON, *Assistant Examiner.*